United States Patent
Kan et al.

(10) Patent No.: US 11,710,598 B2
(45) Date of Patent: Jul. 25, 2023

(54) METHOD FOR MANUFACTURING FIELD MAGNET

(71) Applicant: AICHI STEEL CORPORATION, Tokai (JP)

(72) Inventors: Satoru Kan, Aichi-ken (JP); Hiroaki Hirano, Aichi-ken (JP); Hironari Mitarai, Aichi-ken (JP); Takumi Asano, Aichi-ken (JP); Motonobu Furuyama, Aichi-ken (JP)

(73) Assignee: AICHI STEEL CORPORATION, Tokai (JP)

( * ) Notice: Subject to any disclaimer, the term of this patent is extended or adjusted under 35 U.S.C. 154(b) by 0 days.

(21) Appl. No.: 17/595,349

(22) PCT Filed: May 29, 2020

(86) PCT No.: PCT/JP2020/021350
§ 371 (c)(1),
(2) Date: Nov. 15, 2021

(87) PCT Pub. No.: WO2020/241828
PCT Pub. Date: Dec. 3, 2020

(65) Prior Publication Data
US 2022/0223341 A1 Jul. 14, 2022

(30) Foreign Application Priority Data
May 31, 2019 (JP) .................. 2019-102775

(51) Int. Cl.
*H01F 41/02* (2006.01)
*B29C 65/66* (2006.01)
(Continued)

(52) U.S. Cl.
CPC ......... *H01F 41/0266* (2013.01); *B29C 65/66* (2013.01); *H01F 1/083* (2013.01);
(Continued)

(58) Field of Classification Search
CPC .......... H02K 15/03; H02K 1/276; H02K 1/28; H02K 1/17; H02K 1/2733; H01F 41/0266;
(Continued)

(56) References Cited

U.S. PATENT DOCUMENTS 7,812,484 B2 * 10/2010 Honkura ................. F04D 13/06
310/156.43
9,312,055 B2 * 4/2016 Honkura .................... H01F 1/01
(Continued)

FOREIGN PATENT DOCUMENTS

JP 2000-037054 A 2/2000
JP 2000-184642 A 6/2000
(Continued)

OTHER PUBLICATIONS

Extended European Search Report dated Jun. 23, 2022 in European Application No. 20814007.9.
(Continued)

*Primary Examiner* — Thiem D Phan
(74) *Attorney, Agent, or Firm* — Sughrue Mion, PLLC (57) ABSTRACT

A field magnet manufacturing method where a bonded magnet's inner surface press-fitted in a yoke has a certain accuracy irrespective of the accuracy of the yoke's outer circumferential surface. A cylindrical bonded magnet from binding magnet particles with a thermosetting resin is fixed in a tubular yoke of magnetic material. The method includes reheating and softening the bonded magnet after thermal curing; and press-fitting in the bonded magnet after the softening step from a tapered portion on one end side of the yoke to press the bonded magnet's outer circumferential surface against the yoke's inner surface. The press-fitting includes feeding the bonded magnet relatively into the yoke while allowing a relative posture variation between the (Continued)

bonded magnet and the yoke so the bonded magnet's inner surface to be remolded into a shape along the inner surface of the yoke exhibits almost the same accuracy as the yoke's inner surface.

6 Claims, 4 Drawing Sheets

(51) Int. Cl.
    *H01F 1/08*     (2006.01)
    *H01F 1/28*     (2006.01)
    *H02K 15/03*     (2006.01)
    *B29L 31/00*     (2006.01)

(52) U.S. Cl.
    CPC ............... *H01F 1/28* (2013.01); *H02K 15/03* (2013.01); *B29L 2031/749* (2013.01); *Y10T 29/49012* (2015.01)

(58) Field of Classification Search
    CPC .......... H01F 1/0578; H01F 1/08; H01F 41/02; H01F 7/02; Y10T 29/49009; Y10T 29/49012
    USPC ........................ 29/596, 598, 602.1, 729, 732
    See application file for complete search history.

(56) References Cited

U.S. PATENT DOCUMENTS

| 9,666,341 | B2 | 5/2017 | Honkura et al. |
| 9,799,446 | B2 | 10/2017 | Honkura et al. |
| 2008/0124235 | A1 | 5/2008 | Honkura et al. |
| 2013/0069747 | A1 | 3/2013 | Honkura et al. |
| 2013/0093121 | A1 | 4/2013 | Honkura et al. |
| 2017/0221631 | A1 | 8/2017 | Honkura et al. |

FOREIGN PATENT DOCUMENTS

| JP | 2005-033844 A | 2/2005 |
| JP | 4241209 B2 | 3/2009 |
| WO | 2006/001304 A1 | 1/2006 |
| WO | 2006/059603 A1 | 6/2006 |
| WO | 2011/126026 A1 | 10/2011 |

OTHER PUBLICATIONS

International Search Report for PCT/JP2020/021350, dated Jul. 7, 2020.

International Preliminary Report on Patentability dated Dec. 9, 2021 in International Application No. PCT/JP2020/021350.

* cited by examiner

METHOD FOR MANUFACTURING FIELD MAGNET

This application is a National Stage of International Application No. PCT/JP2020/021350 filed May 29, 2020, claiming priority based on Japanese Patent Application No. 2019-102775 filed May 31, 2019.

TECHNICAL FIELD

The present invention relates to a method for manufacturing a field magnet comprising a bonded magnet and a yoke (such as a case).

BACKGROUND ART

Permanent magnet field type motors (including generators/simply referred to as a "motor" or "motors") are widely used as drive sources for various devices. To improve the performance, miniaturization, cost reduction, etc. of such motors, it has been proposed to integrate a cylindrical bonded magnet (permanent magnet for the field) in a cylindrical yoke (e.g., the case of a motor). Descriptions relevant to this are found in the following patent documents.

PRIOR ART DOCUMENTS

Patent Documents

Patent Document 1: JP2000-184642A
Patent Document 2: WO2006/1304
Patent Document 3: WO2011/126026
Patent Document 4: JP2005-33844A
Patent Document 5: WO2006/059603

SUMMARY OF INVENTION

Technical Problem

These patent documents all propose a method of pressure-bonding a bonded magnet to the inner surface of a yoke without using an adhesive. Specifically, Patent Document 1 discloses pressure-bonding a bonded magnet and a yoke to each other using a phenomenon that the bonded magnet disposed in the yoke oxidizes and expands by heating. Patent Document 2 discloses press-fitting a molded body (bonded magnet before thermal curing) directly into a yoke from a cavity and pressure-bonding the two using springback of the molded body. Patent Document 3 discloses press-fitting a molded body in a warm state directly into a case (yoke) and then pressure-bonding the two using an expansion amount of the molded body generated during thermal curing treatment (cure treatment). Patent Documents 1 to 3 are common in that a molded body is placed or fitted in a yoke (case) and then thermal curing treatment is performed.

Patent Documents 4 and 5 disclose reheating a molded body after thermal curing treatment to a temperature equal to or lower than the glass transition point and then press-fitting the molded body into a housing (yoke/case) to pressure-bond the two. The press-fitting performed in this operation is not described in detail in these patent documents, but may be performed while restraining the outer circumferential side of the housing on the assumption that a high level of accuracy (such as coaxiality, circularity, or cylindricity) is ensured between the outer circumferential surface and inner surface of the housing.

However, the accuracy of the outer circumferential surface itself of the housing is basically unrelated to the performance of the motor. If a high level of accuracy is not required for the outer circumferential surface, the manufacturing cost of the housing (case/yoke) can be reduced, and the cost of the motor can also be reduced accordingly.

The present invention has been made in view of such circumstances, and an object of the present invention is to provide a novel manufacturing method capable of reducing the cost of a field magnet comprising a bonded magnet and a yoke, unlike the conventional methods.

Solution to Problem

As a result of intensive studies to achieve the above object, the present inventors have succeeded in press-fitting a bonded magnet into a yoke (case) without restraining the outer circumferential side of the yoke. Developing this achievement, the present inventors have accomplished the present invention, which will be described below.

«Method for Manufacturing Field Magnet»

(1) The present invention provides a method for manufacturing a field magnet configured such that a cylindrical bonded magnet is fixed in a tubular yoke composed of a magnetic material. The bonded magnet is obtained by binding magnet particles with a thermosetting resin. The method comprises: a softening step for reheating and softening the bonded magnet after thermal curing treatment; and a press-fitting step for fitting in the bonded magnet after the softening step from one end side of the yoke to press an outer circumferential surface of the bonded magnet against an inner surface of the yoke. The press-fitting step includes feeding the bonded magnet relatively into the yoke while allowing a relative posture variation between the bonded magnet and the yoke.

(2) According to the manufacturing method of the present invention, the inner surface of the bonded magnet after the press fitting can be imparted with almost the same level of accuracy as the accuracy (such as coaxiality or circularity) of the inner surface (inner cylinder portion) of the yoke regardless of the accuracy of the outer circumferential surface (outer cylinder portion) or the like of the yoke (such as a case). Therefore, if a yoke having a desired level of accuracy ensured at least for the inner surface is prepared, a field magnet is obtained in which a desired constant gap is ensured between the inner surface of the bonded magnet and the outer circumferential surface of a rotor (armature). As a result, the cost of the yoke (such as a case) can be reduced, and the cost of the field magnet and motor can also be reduced accordingly.

The reason why such a field magnet can be obtained by the manufacturing method of the present invention is considered as follows. First, the bonded magnet before the thermal curing treatment (cure treatment) (simply referred to as a "molded body") is configured such that a mixture of magnet particles and a resin that has been softened or melted by heating is molded in the cavity of a mold into a desired shape (cylindrical shape).

The molded body that has been taken out from the cavity and has not been completely cooled and solidified has insufficient strength and rigidity and has plasticity. In the molded body, therefore, slight deformation (strain) may occur due to handling such as when it is taken out from the cavity or when it is conveyed thereafter.

Bonded magnets are usually manufactured by being completely cooled (solidified) and then subjected to thermal curing treatment such as through a batch process without restoring the strain caused in such a molded body. The strain caused in the molded body therefore remains in the bonded magnet subjected to the thermal curing treatment. The bonded magnet after the thermal curing treatment has sufficiently high strength or high rigidity, so if it is press-fitted into the yoke without any treatment, the strain affects the accuracy of the inner surface of the bonded magnet in the yoke.

In the manufacturing method of the present invention, first, the bonded magnet after the thermal curing treatment is reheated and softened. The softened bonded magnet has the strength and rigidity required for press fitting and also has plasticity. As this bonded magnet is fed along the inner surface of the yoke in a state in which the relative posture variation with the yoke is allowed, the bonded magnet comes to a shape along the inner surface of the yoke for which the accuracy is ensured. In other words, the bonded magnet is not strained by receiving extra external force or the like when fed by pressure, and the deformation before the reheating is restored. It is thus considered that the inner surface of the bonded magnet has almost the same level of accuracy as that of the inner surface of the yoke.

«Others»

(1) In the present specification, for descriptive purposes, the bonded magnet side is referred to as one end side while the yoke side is referred to as the other end side. When the yoke is viewed, the side from which the bonded magnet is introduced is the one end side while the opposite side is the other end side. When the bonded magnet is viewed, the tip side to be is fitted (fed) into the yoke is the other end side while the rear end side (opposite side) is the one end side. When the yoke is placed above the bonded magnet and press-fitted, the lower side is the one end side while the upper side is the other end side.

(2) Unless otherwise stated, a numerical range "x to y" as referred to in the present specification includes the lower limit x and the upper limit y. Any numerical value included in various numerical values or numerical ranges described in the present specification may be selected or extracted as a new lower or upper limit, and any numerical range such as "a to b" can thereby be newly provided using such a new lower or upper limit. As referred to in the present specification, "x to y µm" means x µm to y µm. The same applies to other unit systems.

EMBODIMENTS FOR CARRYING OUT THE INVENTION

One or more features freely selected from the matters described in the present specification can be added to the above-described features of the present invention. Which embodiment is the best or not is different in accordance with objectives, required performance, and other factors. Methodological features regarding a manufacturing method can also be features regarding a product.

«Softening Step»

The softening step includes reheating and softening the bonded magnet subjected to the thermal curing treatment. The softening may be performed to such an extent that the bonded magnet has mechanical properties (such as rigidity and strength) that allow the bonded magnet to be press-fitted into the yoke and plasticity that allows the bonded magnet to be in a cylindrical shape along the inner surface of the yoke.

The heating temperature of the bonded magnet is appropriately adjusted in accordance with the type of thermosetting resin, its mass ratio, thermal history, and the like. In general, the bonded magnet may be heated at a temperature lower than a thermal curing treatment temperature $(T_0)+100$ degrees. For example, that temperature may be $T_0+70°$ C. or lower in an embodiment, $T_0+40°$ C. or lower in another embodiment, $T_0+10°$ C. or lower in still another embodiment, To or lower in yet another embodiment, or $T_0-20°$ C. or lower in still yet another embodiment. From another aspect, the temperature may be 40° C. or higher in an embodiment or 50° C. or higher in another embodiment. As an example, when the thermosetting resin is a phenol novolac type epoxy resin, that temperature may be, for example, 270° C. to 40° C. in an embodiment, 240° C. to 40° C. in another embodiment, 210° C. to 50° C. in still another embodiment, 180° C. to 60° C. in yet another embodiment, 150° C. to 90° C. in still yet another embodiment, 140° C. to 100° C. in a further embodiment, or 130° C. to 110° C. in a still further embodiment. As another example, when the thermosetting resin is a bisphenol A type epoxy resin, that temperature may be, for example, 150° C. to 40° C. in an embodiment, 120° C. to 40° C. in another embodiment, 90° C. to 40° C. in still another embodiment, 80° C. to 50° C. in yet another embodiment, or 70° C. to 55° C. in still yet another embodiment.

If the reheating temperature is unduly high, the rigidity or the like of the bonded magnet may deteriorate, making the press fitting difficult. If the temperature is unduly low, the plasticity of the bonded magnet may deteriorate, causing cracks in the bonded magnet or making it difficult to follow the shape along the inner surface of the yoke. The heating temperature of the bonded magnet as referred to in the present specification is the atmospheric temperature of a heating furnace or the like. When the thermal curing treatment temperature varies, or when the thermal curing treatment is performed in multiple stages, the maximum temperature during the thermal curing treatment may be set as a reference ($T_0$) for the reheating temperature.

The heating time of the bonded magnet can be appropriately adjusted in accordance with its size (thickness), the type and mass ratio of a thermosetting resin, etc. For example, the bonded magnet may be reheated for 10 seconds to 1 hour in an embodiment or 20 seconds to 30 minutes in another embodiment.

«Press-Fitting Step»

The press-fitting step includes feeding the bonded magnet relatively into the yoke while allowing the relative posture variation. When at least one of the bonded magnet and the yoke is in an unrestrained state (non-fixed state), the relative posture variation is possible between the two. At least a part of the bonded magnet and/or the yoke may be supported by a guide within a range in which the posture variation is possible. In other words, the press-fitting step may be performed, for example, in a completely unrestrained state (free state) of the outer circumferential side of the yoke or may otherwise be performed in a state in which a part of the outer circumferential side and/or the end portion side of the yoke is partially restrained by a guide or the like (e.g., a state in which, with reference to FIG. 1A to be described later, a flat surface portion 131 of a case 1 is preliminarily in contact with an inner bottom surface 33a of a receiving jig 3). Likewise, the press-fitting step may be performed, for example, in a completely unrestrained state (free state) of the inner side (e.g., an inner surface 22a illustrated in FIG. 1A) and/or the outer circumferential side (e.g., an outer circumferential surface 22b illustrated in FIG. 1A) of the bonded magnet.

The posture variation may involve only translational movement, only rotational movement, or a combination of the two. The rotational movement may involve rotation around a certain starting point (such as a contact point with a jig) or rotation around another momentary center. The posture variation may involve, for example, lateral movement with respect to the feeding direction (approximately the central axis direction), so-called swinging, or the like. In essence, it is preferred that a state be obtained in which extra force does not act on the bonded magnet at the time of press fitting and the bonded magnet is smoothly fitted in along the inner surface of the yoke. The posture variation may be achieved by the movement of one of the yoke and the bonded magnet or may also be achieved by the movement of the two (cooperation).

The inner surface side of the yoke, with which the tip end portion (other end portion) of the bonded magnet comes into contact at the time of press fitting, is preferably formed with a tapered introduction portion (simply referred to as a "tapered portion") whose diameter increases toward the one end side. This enables smooth feeding of the bonded magnet into the yoke. The inclination angle of the tapered portion may be, for example, 5° to 12° in an embodiment or 6° to 10° in another embodiment with respect to the central axis.

As substitute for the tapered portion or in addition to the tapered portion, another tapered portion such as a chamfer may be further provided on the outer circumferential edge of the tip portion of the bonded magnet. Additionally or alternatively, even when the case has no tapered portion, a tapered portion may be separately provided on the one end side.

The interference, or tightening margin, is appropriately adjusted in accordance with the thickness of the bonded magnet and yoke, the rigidity of the bonded magnet, the application of the motor, etc. The interference may be such that at least the bonded magnet does not fall off from the yoke after the press-fitting step.

«Yoke»

The yoke is composed of a magnetic material. Provided that the inner surface of the yoke is a cylindrical surface, the outer circumferential surface may be or may not be a cylindrical surface. It suffices that at least the inner surface of the yoke has a desired level of accuracy (e.g., circularity).

The yoke may have a flat surface portion orthogonal to the central axis of the inner surface. The flat surface portion serves, for example, as a reference for the assembling accuracy (e.g., coaxiality) of the bonded magnet, an armature, or the like. The flat surface portion may be located, for example, on the other end side of the yoke (opposite side to the introduction portion). When the case of a motor also serves as the yoke, the cost and size of the motor can be reduced.

«Bonded Magnet»

The bonded magnet is obtained by subjecting a cylindrical molded body comprising magnet particles and a thermosetting resin to thermal curing treatment.

(1) At least a part of the magnet particles is preferably rare earth magnet particles. This allows the bonded magnet and accordingly a motor to have improved performance, reduced size, etc. The magnet particles may be isotropic or anisotropic. The bonded magnet composed of at least isotropic magnet particles may be magnetized after being press-fitted into the yoke. The bonded magnet composed of anisotropic magnet particles may be formed of a molded body molded in magnetic field orientation. In this case, magnetization may be further performed.

The rare earth magnet particles are, for example, Nd—Fe—B-based magnet particles, Sm—Fe—N-based magnet particles, Sm—Co-based magnet particles, or the like. The magnet particles are not limited to one type and may be a mixture of a plurality of types. For example, the plurality of types of magnet particles may have different component compositions, different particle size distributions, or both.

(2) The thermosetting resin which is a binder resin is, for example, an epoxy resin, a phenol resin, an unsaturated polyester resin, an amino resin, a polyamide resin, a polyimide resin, a polyamideimide resin, a urea-formaldehyde resin, a melamine resin, a urea resin, a diallyl phthalate resin, polyurethane, or the like. In the present specification, when a curing agent, a curing aid, etc. are required for the thermal curing, inclusion of them is referred to as a thermosetting resin.

The bonded magnet may appropriately contain a small amount of various additives that improve the wettability, adhesion, and the like between the softened or melted thermosetting resin and the magnet powder. Examples of such additives include, for example, alcohol-based lubricants and titanate-based or silane-based coupling agents.

(3) The conditions of the thermal curing treatment are appropriately adjusted in accordance with the type of the thermosetting resin, the size of the bonded magnet, etc. When the thermosetting resin is an epoxy resin, the conditions may be adjusted within the ranges of heating temperature: 80° C. to 200° C. and heating time: 10 to 60 minutes, depending on the type of resin. The heating atmosphere may be an air atmosphere, but a non-oxidizing atmosphere (such as Ar, $N_2$, or vacuum) can suppress the deterioration of the bonded magnet (magnet particles) due to oxidation.

«Field Magnet»

The field magnet obtained by the manufacturing method of the present invention may be used for a direct current (DC) motor or an alternating current (AC) motor. The field magnet is typically used as a stator of a small DC motor in which the armature is a rotor. Motors as referred to in the present specification also include generators.

EXAMPLES

The present invention will be described in more detail by exemplifying a case in which the ring magnet (bonded magnet) is attached to the case of a motor (yoke).

«Configuration»

Figure 1A:
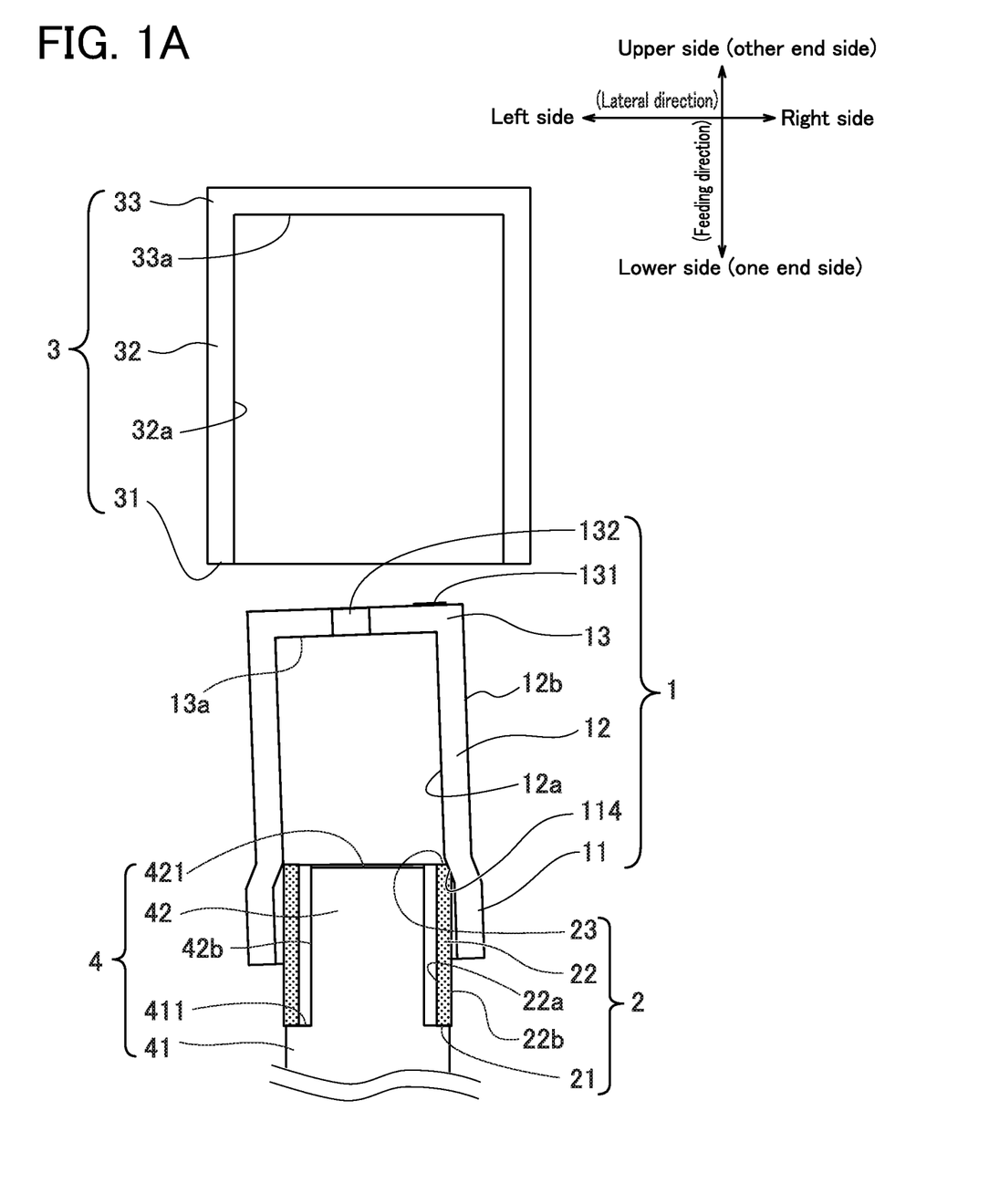
FIG. 1A is a cross-sectional view schematically illustrating a case, a ring magnet, and assembling jigs for the case and the ring magnet.

FIG. 1A illustrates a case 1 and a ring magnet 2 that constitute a field magnet, and a receiving jig 3 and a feeding jig 4 that are used for assembling the case 1 and the ring magnet 2. For descriptive purposes, the up-down direction, the right-left direction, the feeding direction, and the lateral direction are respective directions illustrated in FIG. 1A. In this case, the one end side as referred to in the present specification is on the lower side, and the other end side is on the upper side.

The case 1 is formed by molding a soft iron steel plate (magnetic material) into an approximately bottomed cylindrical shape. The case 1 includes an opening portion 11, a cylindrical portion 12, and a bottom portion 13 in this order from the one end side. The opening portion 11 has a tapered portion 114 (introduction portion) inside the other end side. The tapered portion 114 smoothly merges into the cylindrical portion 12 while reducing the diameter from the one end side (opening side) whose diameter is increased. The cylindrical portion 12 has an inner surface 12a and an outer circumference surface 12b. The inner surface 12a has a desired level of accuracy (at least circularity), but the accuracy of the outer circumferential surface 12b is not ensured.

Figure 1B:
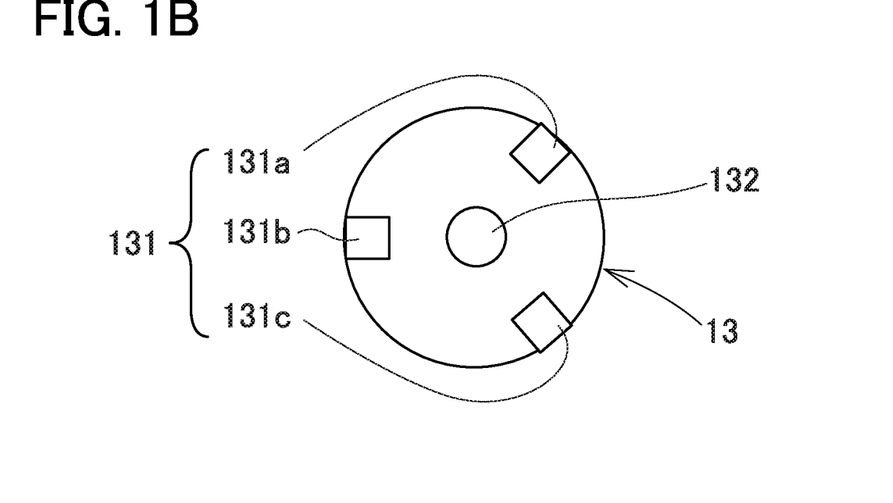
FIG. 1B is a plan view of the other end side of the case.

The bottom portion 13 has a shaft hole 132 at the center for supporting one end portion of the shaft of a rotor (armature). As illustrated in FIG. 1B, three flat surface portions 131a to 131c (collectively referred to as a "flat surface portion 131") are formed around the shaft hole 132 on the other end outer surface of the bottom portion 13. The flat surface portion 131 has a predetermined flatness and a predetermined squareness with respect to the central axis of the cylindrical inner surface 12a and serves as an assembly reference or measurement reference for the field magnet or a motor.

The ring magnet 2 is composed of a bonded magnet obtained by subjecting a molded body to thermal curing treatment. The bonded magnet is formed by compression-molding a compound comprising rare earth magnet particles and a thermosetting resin into a cylindrical shape. The ring magnet 2 has a cylindrical portion 22, an annular end surface 21 on the one end side, and another annular end surface 23 on the other end side.

The cylindrical portion 22 has an inner surface 22a and an outer circumferential surface 22b, neither of which is not ensured to have circularity or the like. However, the inner perimeter or thickness (lateral direction/radial direction) of the cylindrical portion 22 is within a predetermined range.

The receiving jig 3 is a bottomed cylindrical body composed of tool steel. The receiving jig 3 includes an opening portion 31 on the one end side, a cylindrical portion 32, and a bottom portion 33. The inner diameter of the cylindrical portion 32 is larger than the outer diameter of the cylindrical portion 12 of the case 1. Therefore, there is a gap between an inner surface 32a of the receiving jig 3 and the outer circumferential surface 12b of the case 1, and the case 1 is capable of posture variation within the range of the gap.

The bottom portion 33 has an inner bottom surface 33a, which is formed of a smooth flat surface having a predetermined flatness. The receiving jig 3 is arranged (fixed) so that its inner bottom surface 33a is orthogonal to the vertical direction (feeding direction).

The feeding jig 4 is a stepped cylindrical body composed of tool steel. The feeding jig 4 includes a cylindrical base portion 41 and a cylindrical interpolation portion 42 that extends upward (on the other surface side) from the base portion 41. The outer diameter of the base portion 41 is slightly smaller than the outer diameter of the ring magnet 2 (outer circumferential surface 22b). The outer diameter of the interpolation portion 42 is smaller than the outer diameter of the base portion 41 and further smaller than the inner diameter of the ring magnet 2 (inner surface 22a). The ring magnet 2 is placed on an annular lower surface 411 formed between the base portion 41 and the interpolation portion 42 so that the end surface 21 is in contact with the lower surface 411. There is also a gap between an outer circumferential surface 42b of the interpolation portion 42 and an inner surface 22a of the ring magnet 2, and the ring magnet 2 is capable of posture variation within the range of the gap.

The length of the interpolation portion 42 in the up-down direction is shorter than that of the ring magnet 2, and an upper surface 421 of the interpolation portion 42 does not protrude from the end surface 23 of the ring magnet 2 placed on the feeding jig 4. Therefore, the end surface 23 of the ring magnet 2 can be fed to a position, or its vicinity, at which the end surface 23 comes into contact with an inner bottom surface 13a of the case 1. At that time, the upper surface 421 of the interpolation portion 42 does not come into contact with the inner bottom surface 13a of the case 1, and therefore the accuracy of the bottom portion 13 (flatness or the like of the flat surface portion 131) is also maintained.

A hydraulic cylinder (not illustrated) is disposed on the one end side of the feeding jig 4, and the feeding jig 4 moves up and down at a desired speed by controlling the pressure of oil supplied to the hydraulic cylinder.

At least one of the receiving jig 3 and the feeding jig 4 may also be allowed to change its posture with respect to the press-fitting direction. For example, at least one of the jigs may be moved up and down via a universal joint or the like extending in the press-fitting direction. The posture variation of the receiving jig 3 and/or the feeding jig 4 may be performed together with or as substitute for the posture variation between the case 1 and the ring magnet 2.

«Assembly»

(1) Softening Step

First, the ring magnet 2 is preliminarily heated in a heating furnace (air atmosphere) at a temperature lower than the thermal curing treatment temperature. This allows the ring magnet 2 to exhibit plasticity while maintaining the strength and rigidity required for the press fitting.

(2) Setting Step

Then, as illustrated in FIG. 1A, the softened ring magnet 2 is engaged with the interpolation portion 42 from above and set on the feeding jig 4. As described previously, there is a gap between the inner surface 22a of the ring magnet 2 and the interpolation portion 42 of the feeding jig 4, and the ring magnet 2 can therefore move laterally within the range of the gap.

Further, the opening portion 11 of the case 1 is engaged with the ring magnet 2 from above. At this time, the case 1 is held in a state in which the inner surface of the tapered portion 114 is in contact with the outer circumferential edge of the end surface 23 of the ring magnet 2.

(3) Press-Fitting Step

In a state in which the ring magnet 2 is covered with the case 1, the hydraulic cylinder is operated to move the feeding jig 4 upward. This allows the bottom portion 13 and cylindrical portion 12 of the case 1 to enter the inside of the cylindrical portion 32 of the receiving jig 3. As described previously, there is a gap between the outer circumferential surface 12b of the case 1 and the cylindrical portion 32 of the receiving jig 3, and therefore the case 1 can also move laterally within the range of the gap.

Figure 2A:
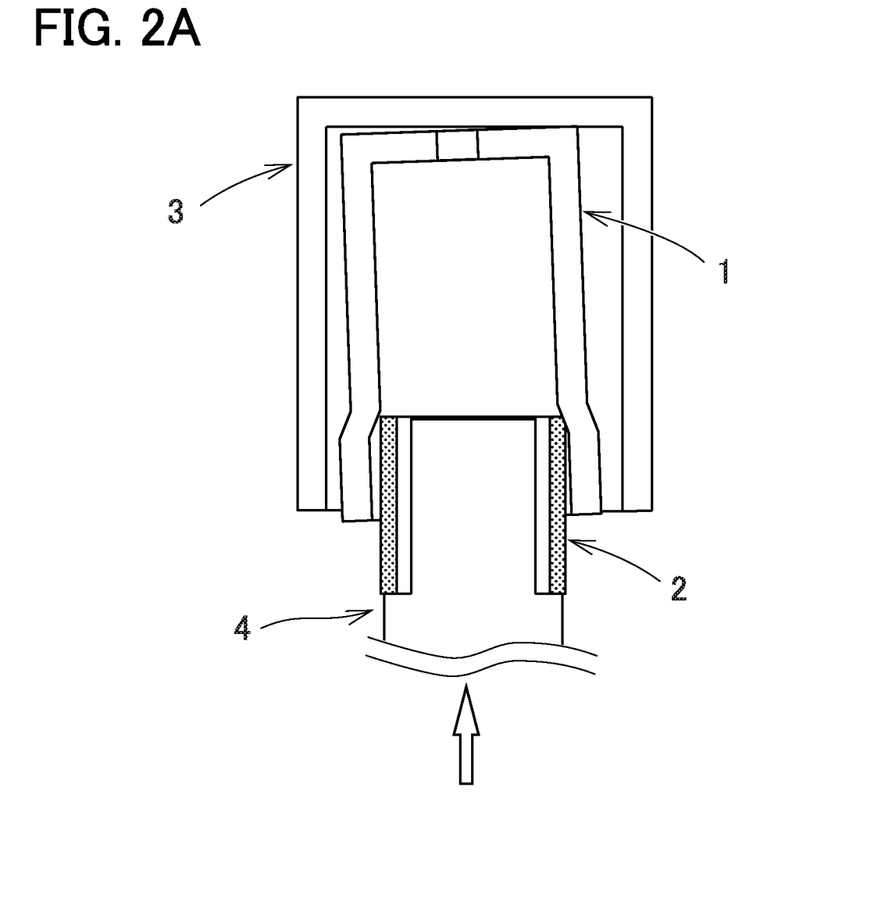
FIG. 2A is a cross-sectional view schematically illustrating the initial stage of assembling the case and the ring magnet.

As the feeding jig 4 is further raised, as illustrated in FIG. 2A, the upper surface outer edge of the bottom portion 13 of the case 1 begins to partially contact the inner bottom surface 33a of the receiving jig 3.

Figure 2B:
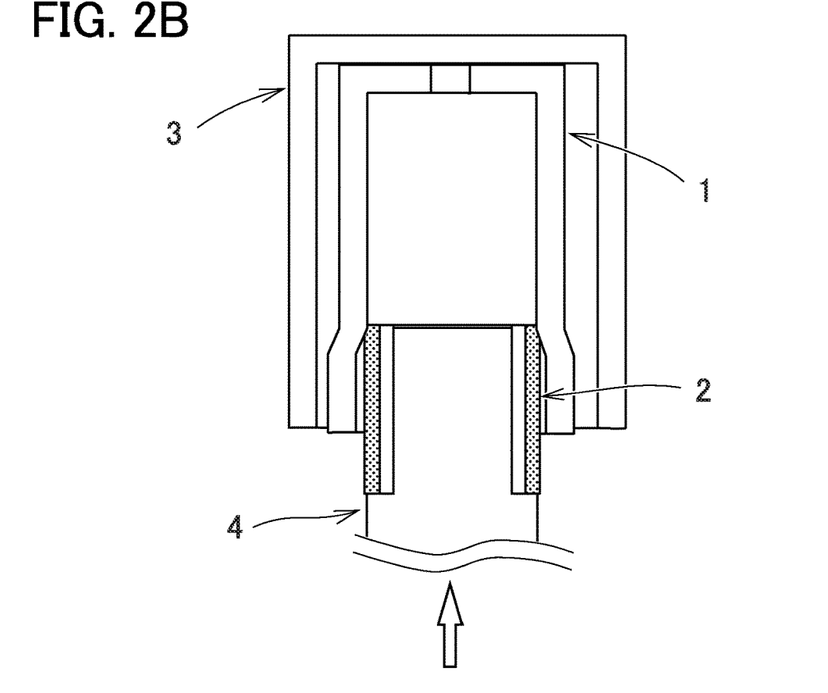
FIG. 2B is a cross-sectional view schematically illustrating the middle stage of assembling the case and the ring magnet.

As the feeding jig 4 moves further upward, the upper surface outer edge of the bottom portion 13 of the case 1 slides on the inner bottom surface 33a of the receiving jig 3 while the case 1 and the ring magnet 2 undergo the posture variation or move in the lateral direction. Then, as illustrated in FIG. 2B, the flat surface portion 131 of the case 1 comes into contact with the inner bottom surface 33a of the receiving jig 3. Thus, the case 1 and the ring magnet 2 come into a state in which they are automatically aligned. That is, a state is obtained in which the central axes of the case 1 and ring magnet 2 are approximately aligned with each other along the direction (vertical direction) orthogonal to the flat surface portion 131 and the inner bottom surface 33a.

Figure 2C:
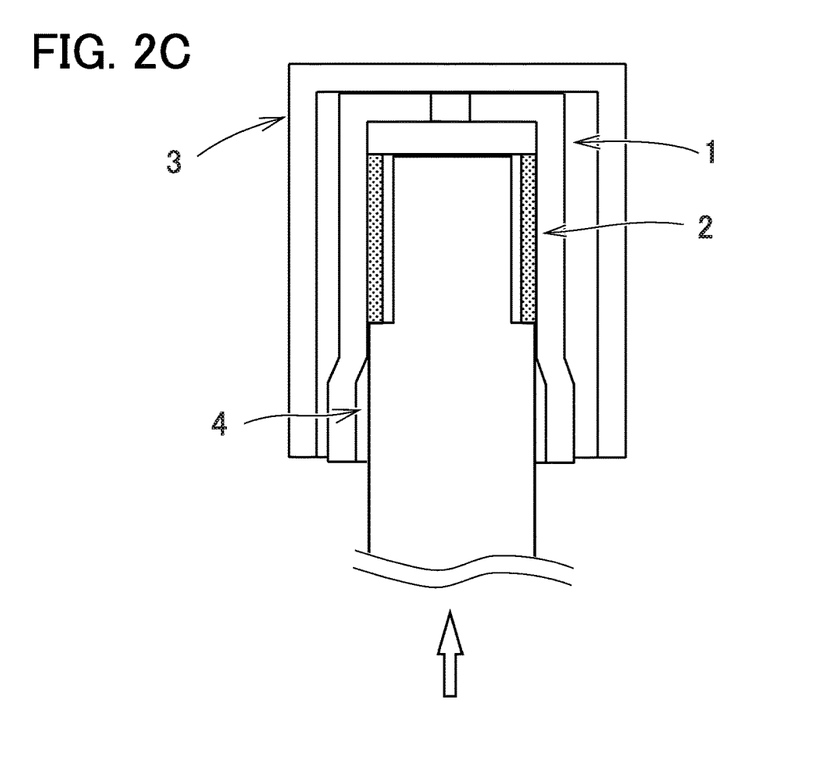
FIG. 2C is a cross-sectional view schematically illustrating the late stage of assembling the case and the ring magnet.

After the case 1 and the ring magnet 2 come into the aligned state, the ring magnet 2 is fed into the case 1, as illustrated in FIG. 2C, as the feeding jig 4 is further raised. Here, the ring magnet 2 has sufficient strength and rigidity so as not to buckle and also has plasticity that allows the ring magnet 2 to deform into a shape along the inner surface 12a of the case 1. The ring magnet 2 is therefore remolded along the inner surface 12a of the case 1, in which the circularity is ensured, as the ring magnet 2 is fed into the case 1. As a result, the inner surface 22a of the ring magnet 2 is imparted with almost the same level of accuracy (circularity) as that of the inner surface 12a of the case 1.

The ring magnet 2 may be fed into the case 1 until the end surface 23 comes into contact with the inner bottom surface 13a or may otherwise be stopped at a predetermined position before the contact.

Thus, a field magnet in which the ring magnet 2 is press-fitted in the case 1 can be obtained. The inner surface 22a of the field magnet has a predetermined level of accuracy (such as circularity) around the central axis orthogonal to the flat surface portion 131 of the case 1. As is clear from the above-described steps, the accuracy of the inner surface 22a has been ensured without depending on the accuracy or the like of the outer circumferential surface 12b of the case 1.

Figure 3:
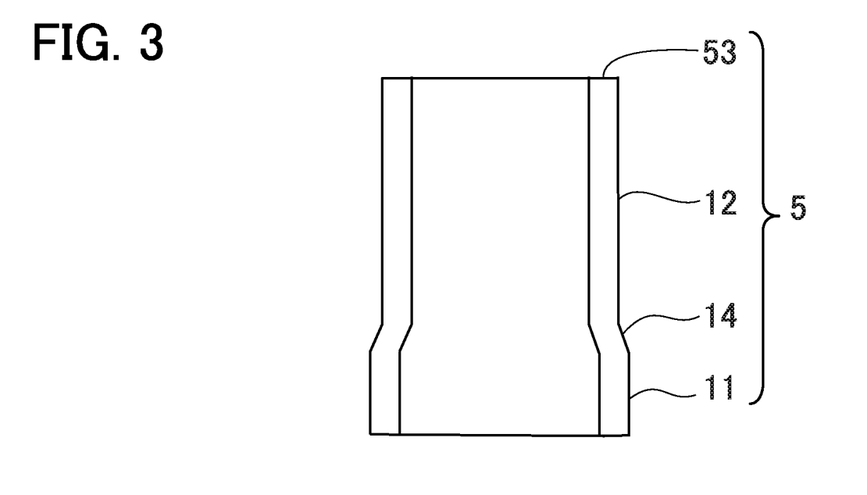
FIG. 3 is a cross-sectional view illustrating a modified example of the case.

Modified Examples (1) As substituted for the case 1, as illustrated in FIG. 3, a case 5 having an opening on the other end side can also be used. The previously described portions will be denoted by the same reference numerals as those described above, and the description thereof will be omitted (here and hereinafter).

When the case 5 is used, the ring magnet 2 is fed into the case 5 after an annular end surface 53 (or its outer edge) of the case 5 slides on and comes into contact with the inner bottom surface 33a of the receiving jig 3. When the end surface 53 has the same level of accuracy as that of the flat surface portion 131, the accuracy (such as coaxiality) of the inner surface 22a of the ring magnet 2 is ensured even when the case 5 is used.

Figure 4:
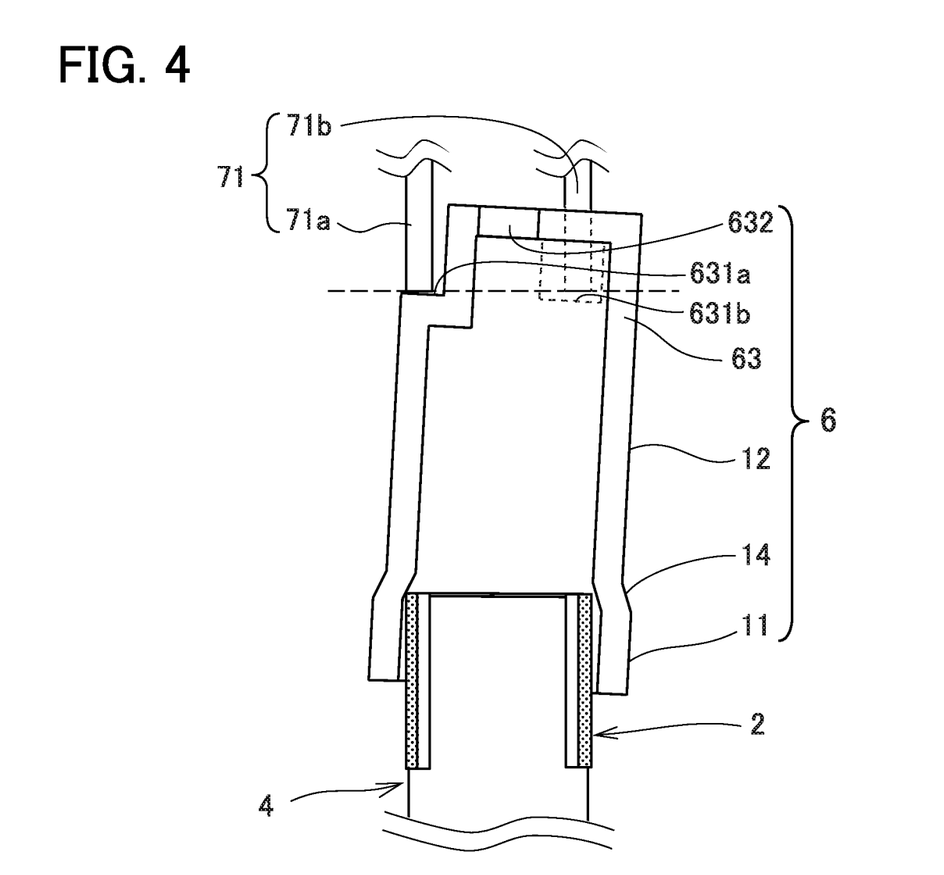
FIG. 4 is a cross-sectional view schematically illustrating another example of assembling the ring magnet to the case.

(2) As substitute for the case 1, as illustrated in FIG. 4, a case 6 having a bottom portion 63 can also be used. The bottom portion 63 has three recesses around a shaft hole 632 (corresponding to the shaft hole 132), and flat surface portions 631a to 631c (collectively referred to as a "flat surface portion 631") are formed on the upper surface side of respective recesses (the flat surface portion 631c is omitted). Likewise the flat surface portion 131, the flat surface portion 631 ensures a desired level of accuracy (squareness) with respect to the central axis.

The receiving jig 3 is changed to a jig having protrusions 71a to 71c (collectively referred to as a "protrusion 71") that each come into contact with the flat surface portion 631 (the protrusion 71c is omitted). When the ring magnet 2 is fed into the case 6 using the feeding jig 4 while the flat surface portion 631 of the case 6 is supported by the protrusion 71, the accuracy of the inner surface 22a of the ring magnet 2 is ensured as in the previously described cases.

Evaluation Examples (1) Case and Ring Magnet

Using the actually manufactured case 1 and ring magnet 2, the effects of the above-described softening step and press-fitting step were confirmed.

For the case 1, a bottomed cylindrical body made of cold-rolled steel plate (outer diameter: φ34.0 mm, inner diameter: φ30.0 mm, length: 70.0 mm) was prepared. The tapered portion 114 (introduction portion) provided on the inner surface side was set to have an inclination angle of 8° with respect to the central axis. The circularity of the inner surface 12a of the case 1 was set to 0.10 mm. The circularity was measured in accordance with JIS B0021 (here and hereinafter).

The ring magnet 2 was manufactured as follows. A compound comprising NdFeB-based rare earth anisotropic magnet particles (available from AICHI STEEL CORPORATION, MAGFINE magnet powder MF15P) and an epoxy resin was used as the raw material. The amount of epoxy resin with respect to the entire compound was 3 mass %. The epoxy resin was a phenol novolac type, and its thermosetting temperature was 150° C.

The compound was compressed while being heated in the cavity of a mold (150° C.×130 MPa×6 seconds) to obtain a cylindrical molded body (outer diameter: φ30.2 mm×inner diameter: φ28.1 mm×length: 30 mm). This molded body was heated in a heating furnace of an air atmosphere and subjected to thermal curing treatment (150° C.×40 minutes). The ring magnet 2 composed of the bonded magnet was thus prepared.

(2) Assembly

First, the ring magnet 2 after the softening step was incorporated into the case 1 using the receiving jig 3 and feeding jig 4 illustrated in FIG. 1A (press-fitting step). In the softening step, the ring magnet 2 was heated in a heating furnace of an air atmosphere (150° C.×30 seconds). The press-fitting step was performed with a load of 985 N and a moving speed of 30 mm/sec.

The inner surface 22a of the ring magnet 2 thus incorporated in the case 1 had a circularity of 0.12 mm.

(3) Comparative Example

When the above-described press-fitting step was performed on the ring magnet 2 which was not subjected to the softening step, cracks sometimes occurred on the inner surface 22a of the ring magnet 2. When the ring magnet 2 after the above-described softening step was fed into the case 1 without allowing the posture variation between the case 1 and the ring magnet 2, the load was abnormal and the press fitting was not able to be performed.

(4) Evaluation

From each measurement result (circularity), it has been confirmed that the inner surface 22a of the ring magnet 2 can have a desired accuracy by press-fitting the softened ring magnet 2 into the case 1 in a state in which the posture variation is allowed. On the contrary, it has been found that when the softening step is omitted or the press-fitting step is performed without allowing the posture variation, it is difficult to properly press-fit the ring magnet 2 into the case 1.

DESCRIPTION OF REFERENCE NUMERALS

1 Case (York)
2 Ring magnet (bonded magnet)

3 Receiving jig
4 Feeding jig

The invention claimed is:

1. A method for manufacturing a field magnet configured such that a cylindrical bonded magnet is fixed in a tubular yoke composed of a magnetic material, the bonded magnet obtained by binding magnet particles with a thermosetting resin, the method comprising:
 a softening step for reheating and softening the bonded magnet after thermal curing treatment; and
 a press-fitting step for fitting in the bonded magnet after the softening step from one end side of the yoke to press an outer circumferential surface of the bonded magnet against an inner surface of the yoke,
 the press-fitting step including feeding the bonded magnet relatively into the yoke by a feeding jig while allowing a relative posture variation between the bonded magnet and the yoke,
 wherein the yoke is supported by a receiving jig and an inner diameter of a cylindrical portion of the receiving jig is larger than an outer diameter of the yoke such that there is a gap between the inner surface of the cylindrical portion of the receiving jig and the outer circumferential surface of the yoke, and
 wherein the feeding jig includes a base portion and a cylindrical interpolation portion extending from the base portion through a center of the bonded magnet, and the outer diameter of the interpolation portion of the feeding jig is smaller than the inner diameter of the bonded magnet such that there is a gap between the outer circumferential surface of the interpolation portion and the inner surface of the bonded magnet.

2. The method for manufacturing a field magnet according to claim 1, wherein the softening step includes heating the bonded magnet at a temperature lower than a temperature that is higher than the thermal curing treatment temperature ($T_0$) by 100° C. ($T_0$+100° C.).

3. The method for manufacturing a field magnet according to claim 1, wherein the press-fitting step is performed without restraining the outer circumferential side of the yoke.

4. The method for manufacturing a field magnet according to claim 1, wherein the inner surface side of the yoke is formed with a tapered introduction portion whose diameter increases toward the one end side.

5. The method for manufacturing a field magnet according to claim 1, wherein the yoke is a case of a motor.

6. The method for manufacturing a field magnet according to claim 1, wherein the yoke has a flat surface portion orthogonal to a central axis of the inner surface on another end side.

* * * * *